Dec. 19, 1961     E. A. BENDER     3,013,427
EVALUATION OF QUENCHING MEDIA
Filed Jan. 27, 1958
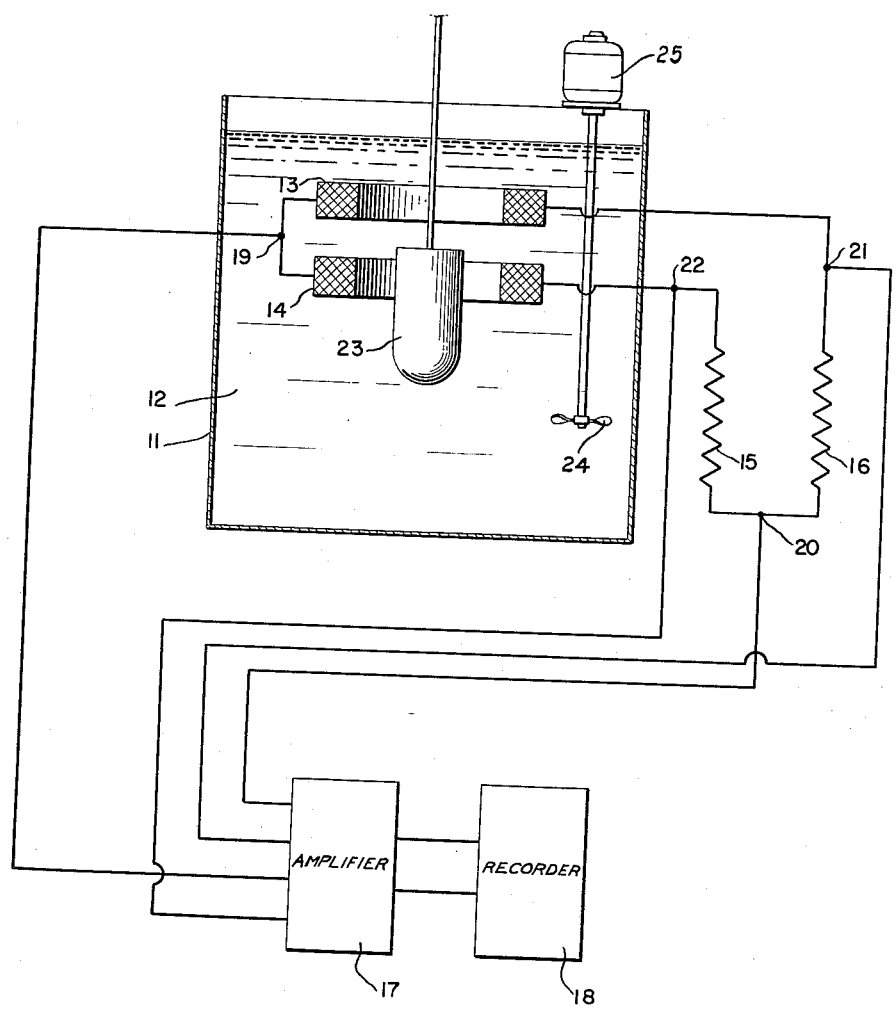
INVENTOR
EDWARD A. BENDER
BY
ATTORNEY

United States Patent Office 3,013,427
Patented Dec. 19, 1961

3,013,427
EVALUATION OF QUENCHING MEDIA
Edward A. Bender, Dearborn, Mich., assignor to General Motors Corporation, Detroit, Mich., a corporation of Delaware
Filed Jan. 27, 1958, Ser. No. 711,485
8 Claims. (Cl. 73—15)

This invention relates to the testing of quenching media and, in particular, to a method and apparatus for determining heat transfer rates or quenching speeds of such media.

It is well known in the metallurgical arts that the quenched properties of any given metal depend to a considerable extent upon the characteristics of the quenching medium used. A variation in the quenching speed appreciably affects the hardness and other physical properties of the metal. Thus it is obvious that in order for a quenching operation to provide a metal with the desired characteristics, the quenching rate or speed of the quenching action must be accurately controlled.

Various methods have been employed for evaluating quenching media. For example, one such method is the hot wire test in which the maximum amount of current required to burn out a wire of constant length and gage while immersed in the quenching liquid is an indication of the heat extraction value of the liquid. Another test involves measuring the rise in temperature of the fluid produced by quenching a heated test bar of predetermined size for a given period of time. Both of these tests are inherently difficult to conduct and are erratic. In view of the critical nature of the quenching speed, it is obvious that the results of any test must be accurate and at the same time be adaptable to production techniques.

Accordingly, a principal object of the present invention is to provide a simple and commercially practical method for accurately determining the quenching characteristics of a fluid stream regardless of whether the medium is in the gaseous or liquid state. A further object of this invention is to provide an apparatus for accurately determining the quenching speed of a fluid medium.

Other objects and advantages of the invention will more fully appear from the following detailed description of a preferred embodiment thereof, reference being made to the accompanying drawing. This drawing contains a somewhat schematic view of an apparatus which may be used to carry out the inventive process.

In accordance with the present invention, the effectiveness of any particular quenching medium is determined by measuring the time required for the medium to cool a specimen of magnetic material from a predetermined temperature, at which the magnetic properties are not present, to another known temperature, at which the material regains its magnetic properties.

It is well known that the magnetic permeability of a magnetic material increases with temperature rise up to a critical point. At this temperature the permeability assumes a value of unity and the magnetic properties no longer exist. This temperature, which is known as the Curie point, varies over a wide range of temperatures for different metals. This wide variation in the temperature at which the Curie point occurs makes it possible to accurately evaluate the heat-extraction value of any selected quenching medium at any desired temperature range by the use of the appropriate magnetic metal, as will be hereinafter more fully explained. Since most quenching operations are carried out in the range between 500° F. to 2000° F., two metals which are particularly adaptable to this process are substantially pure nickel and stainless steel, which have Curie points of 665° F. and 1250° F. to 1600° F., respectively. However, any other suitable magnetic material may be used in this process.

The simplest method of practicing the invention comprises heating a specimen of magnetizable material to some predetermined temperature above its Curie point and then suspending it in a glass or other non-magnetic beaker containing the quenchant to be tested. When the specimen becomes magnetic upon cooling to its Curie point, it is attracted to a magnet placed immediately outside the beaker. The time required to quench the specimen from the initial temperature to the Curie point can be recorded by a stop watch. This period of time, of course, is a direct measure of the quench speed of the quenchant tested. While such a procedure is satisfactory in some instances, it is limited in the degree of accuracy of the results produced, and it is unsuitable for many applications.

An improved apparatus embodying the invention incorporates an electrical timing device which greatly improves the accuracy of this procedure. Such an apparatus is illustrated in the drawing, which shows a container or tank 11 filled with a liquid medium 12 to be tested. Immersed in the quenching medium are two annular coils 13 and 14 constituting two arms of an electrical bridge. While the bridge may be any of the well known types, in the apparatus shown these coils and two resistance units 15 and 16 are electrically connected in a "Wheatstone" type arrangement. The bridge circuit is connected at points 19, 20, 21 and 22 to an amplifier 17 which in turn is connected to an electric timer or recorder 18. The amplifier may be any one of numerous types, such as the "Brush Universal Amplifier" model 520 which, in addition to amplifying the output signal of the bridge unbalance, supplies a two kilocycle voltage to energize the bridge coils 13 and 14 and resistors 15 and 16. In this manner the bridge can be balanced to obtain a minimum null condition. Likewise, the recorder may be any one of numerous types, such as a "Texas Instrument Recorder," which indicates the amplitude of the unbalance in the bridge as well as the time lapse. Of course, the amount of bridge energizing voltage to be used will depend on the depth of penetration of eddy currents desired in the magnetic test specimen.

A magnetic test specimen 23 is heated either in air or a controlled atmosphere to a temperature above its Curie point. When this specimen is placed in the tank, it first enters the upper coil and cuts the magnetic lines of force generated by this coil, thereby inducing eddy currents in the specimen. This phenomenon causes an unbalance of the bridge and the resulting signal is amplified and transmitted to the recorder. This signal actuates a relay to start the timing cycle which continues until the specimen, now located in the lower coil 14, is cooled to its Curie point and regains its magnetic properties. This change in magnetic properties causes a further unbalance in the bridge network. As a result, a signal is produced which is amplified and transmitted to the recorder to actuate a second relay which stops the timing cycle. The time interval indicated on the recorder is the number of seconds required to quench the magnetic specimen from the initial elevated temperature to its Curie point.

When it is desired to evaluate the quenching speed of a circulating liquid, the liquid 12 in the tank 11 may be conveniently agitated by means of an impeller 24 located beneath the surface of the quenchant. The impeller can be driven by a suitable variable speed motor 25 to permit circulation of the liquid at a selected rate. It is to be understood, of course, that the apparatus described is merely one satisfactory means for carrying out the process, and the invention is not limited to the arrangement shown.

Of course, the time required by the magnetic metal specimen to regain its magnetic properties in the quenching medium depends on the shape and size of the specimen as well as its composition. Consequently, a standard design and weight of sample should be selected and used throughout all comparative tests. In conducting tests of quenching media, I adopted a 50 gram pure nickel sphere having a diameter of 7/8" as a standard size specimen, and it was used in conjunction with 200 cc. quenchant samples which were maintained at room temperature. These tests were conducted in still oil. Nickel is preferred for this test because of its Curie point and its resistance to scaling and cracking upon repeated heating and cooling. Heating to a temperature of approximately 1550° F. to 1650° F. has produced excellent results when a nickel specimen is employed.

The following is a specific example of a series of tests which have been conducted using the above-described apparatus. The aforementioned nickel sphere, which has a Curie point of about 670° F., was uniformly heated to a temperature of 1600° F. and then immersed in the liquid quenchant so that it was suspended in the center of the lower coil 14 after passing through the upper coil 13. In evaluating a number of quenching oils, the time required to cool the nickel specimen from 1600° F. to its Curie point varied from 7.7 seconds for the oil with the best heat-absorbing properties to 19.6 seconds. The quenchants with the greatest cooling power were commercially available petroleum oils to which had been added various amounts of wetting agents and other additives. The longer quenchant times were produced by straight mineral oils.

As compared with the aforementioned hot wire quench test and the "five-second quench test," the magnetic quench test described herein has many practical advantages. It can be performed very simply by a single operator, and trained personnel are not necessary. Moreover, the results are easily reproducible with standard design test specimens of constant weight, and the apparatus can be made automatic with suitable inexpensive electrical instrumentation. Consequently, this magnetic quench test may be conveniently used to ascertain the correct percentages of additives necessary to obtain maximum quenching efficiency in straight mineral oils as well as for routine checking of quench bath efficiency. I have also found that the results produced are very closely correlated with the results of transverse hardness tests, both from the standpoint of the surface hardness of the quenched metal specimen and the hardness penetration as determined on transverse sections of the test specimens.

The process described herein is adapted for many uses, including the evaluation or analysis of the heat extractive rates of gases, liquids and molten salts; the effect of additives to liquids; the inhibiting effect of water and sludge in oil; and the effect of temperature on the quenching media. It also can be employed to determine the effect of agitation on quenching media, the effect of various surface conditions of heat treated parts upon quenching, and the inhibiting effect of salts adhering to the part upon quenching.

While the invention has been described by means of certain specific examples, it will be understood that the scope of the invention is not to be limited thereby except as defined in the following claims.

I claim:
1. A method for determining the quenching speed of a quenching medium comprising heating a magnetic material to a predetermined temperature above its Curie point, immersing the heated magnetic material in said quenching medium, subjecting said magnetic material to a magnetic field while said magnetic material is so immersed, and then measuring the time interval required to quench the magnetic material from said predetermined temperature to the temperature at which said magnetic material regains its magnetism and modifies said magnetic field while located therein.

2. A method for determining the heat extraction power of a fluid medium using a magnetizable material which loses its magnetic properties above a known temperature, said method comprising heating the magnetizable material to a predetermined temperature at which the material is nonmagnetic, immersing the magnetizable material in the fluid medium while said material is at said predetermined temperature, subjecting said magnetizable material to a magnetic field while said material is so immersed, and then measuring the time interval required for said magnetizable material to modify said magnetic field by lowering the temperature of said material to said known temperature whereby said material regains its magnetic properties while within said magnetic field.

3. A method for determining the quenching speed of a quenching medium comprising heating a substantially pure nickel specimen to a temperature of 1550° F. to 1650° F., immersing said heated specimen in said quenching medium, subjecting said heated specimen to a magnetic field while said specimen is so immersed, and then measuring the time interval required to cool said specimen from the said elevated temperature to its Curie point by recording the change in magnetic properties of said specimen while immersed in said quenching medium.

4. A method for determining the quenching speed of a fluid medium using a ferromagnetic material which loses its magnetic properties at a known temperature, said method comprising thermally treating the magnetic material to a predetermined temperature at which the magnetic material is non-magnetic, immersing said magnetic material in the fluid medium, subjecting said ferromagnetic material to a magnetic field while said material is so immersed, and thereafter measuring the time interval required to thermally adjust the magnetic material to said known temperature at which the magnetic material regains its magnetic properties while immersed in said medium.

5. A method for determining the heat extraction power of a liquid quenchant using a magnetic materal which loses its magnetic properties at a known temperature, said method comprising uniformly heating the magnetic material to a predetermined temperature at which the material is nonmagnetic, establishing a magnetic field in said quenchant, immersing said heated magnetic material in said quenchant within said magnetic field while said material is at said predetermined temperature to thereby distort said field, retaining said magnetic material in said quenchant until further modification of the magnetic field indicates that the immersed material has regained its magnetic properties, and recording the elapsed time required for said quenching.

6. Apparatus for determining the quenching speed of a quenching medium, said apparatus comprising a quenching medium in a container, a magnetizable specimen to be immersed in said medium, means for establishing a magnetic field in said medium in the location where said specimen is to be immersed, means for heating said specimen to a predetermined temperature above its Curie point, and means for measuring the time required to cool said specimen from said predetermined temperature to its Curie point while located in said magnetic field and immersed in said quenching medium.

7. Apparatus for determining the quenching speed of a fluid medium comprising means for establishing a magnetic field in said medium, a time recorder coupled to said means and controlled by distortion of said field, and a magnetic specimen heated to a predetermined temperature above the Curie point immersed in said medium within said magnetic field whereby quenching of the specimen to its Curie point controls said recorder.

8. Apparatus for determining the heat extraction power of a quenching medium, said apparatus comprising coil means for establishing a magnetic field in said medium, a time recorder coupled to said means and controlled by distortion of said field, and a magnetic specimen heated to a predetermined temperature above its Curie point immersed in said medium within said magnetic field whereby the quenching of said specimen to its Curie point is indicated by said recorder.

References Cited in the file of this patent

UNITED STATES PATENTS 2,717,515    Pesante _____ Sept. 13, 1955
2,730,894    Husa _____ Jan. 17, 1956

UNITED STATES PATENT OFFICE
CERTIFICATE OF CORRECTION

Patent No. 3,013,427                                December 19, 1961

Edward A. Bender

It is hereby certified that error appears in the above numbered patent requiring correction and that the said Letters Patent should read as corrected below.

Column 1, line 39, for "stream" read -- medium --.

Signed and sealed this 3rd day of July 1962.

(SEAL)

Attest:

ERNEST W. SWIDER
Attesting Officer

DAVID L. LADD
Commissioner of Patents